Nov. 24, 1953     S. D. ORMSBY     2,660,475
VERTICAL STABILIZER FOR VEHICLE WHEELS
Filed Feb. 16, 1950     2 Sheets-Sheet 1
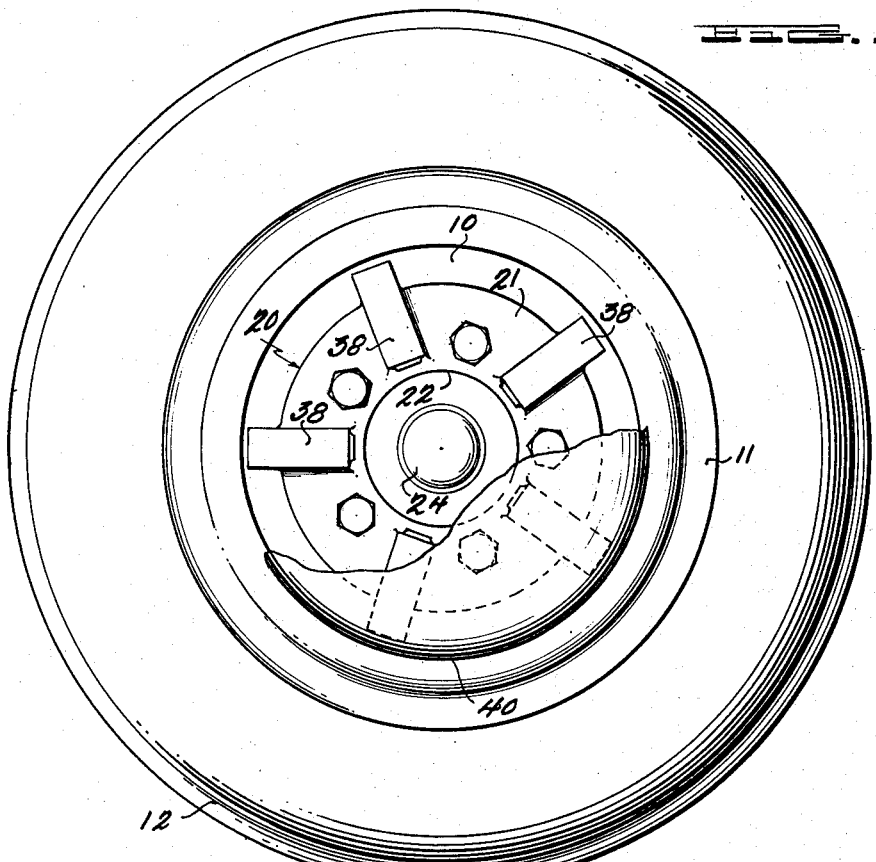
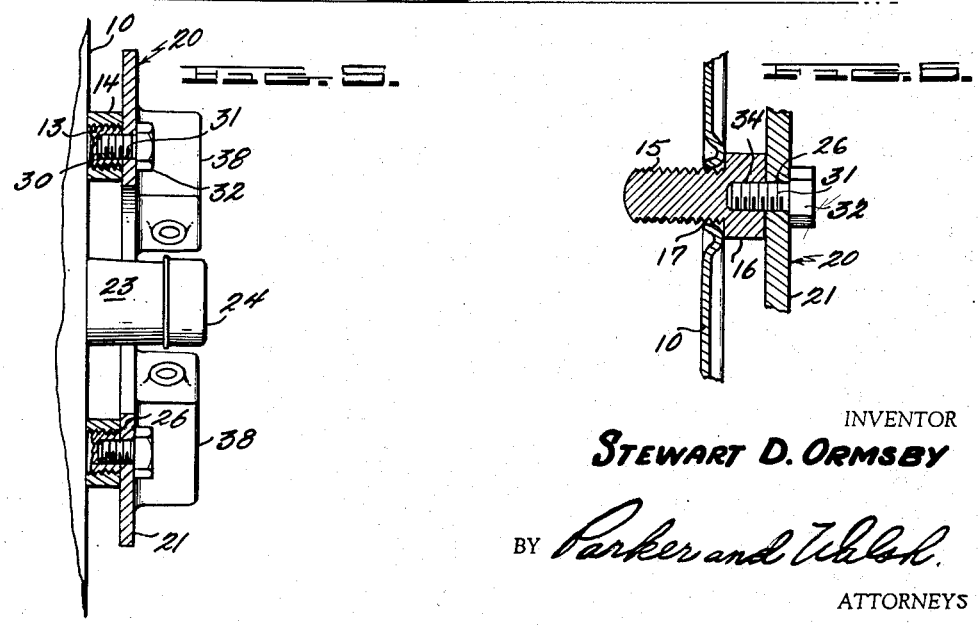
INVENTOR
STEWART D. ORMSBY
BY Parker and Walsh
ATTORNEYS Nov. 24, 1953  S. D. ORMSBY  2,660,475
VERTICAL STABILIZER FOR VEHICLE WHEELS
Filed Feb. 16, 1950  2 Sheets-Sheet 2
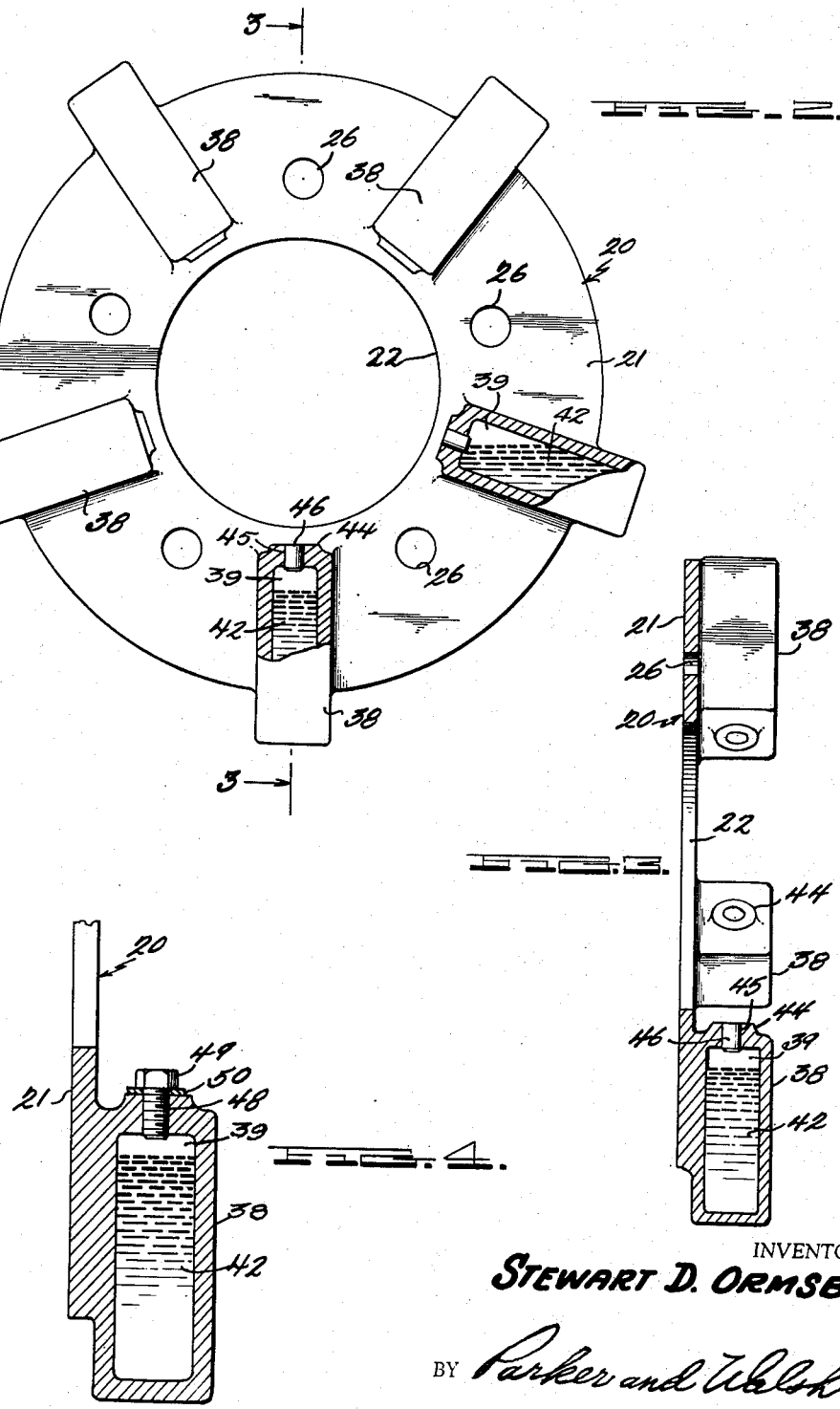
INVENTOR
STEWART D. ORMSBY
BY Parker and Walsh
ATTORNEYS Patented Nov. 24, 1953

2,660,475

UNITED STATES PATENT OFFICE 2,660,475

VERTICAL STABILIZER FOR VEHICLE WHEELS

Stewart D. Ormsby, Oswego, N. Y.

Application February 16, 1950, Serial No. 144,422

6 Claims. (Cl. 301—5)

This invention relates to vertical stabilizers for vehicle wheels.

Much progress has been made in recent years in vertically cushioning and stabilizing vehicle bodies to improve the riding qualities thereof, such improvements being in the nature of improved spring suspensions and shock absorbers. The springs on a motor vehicle are necessarily designed as a compromise construction since they must be sufficiently heavy to withstand the heaviest loads to which they will be subjected, for example, when a vehicle is loaded to capacity in traveling over relatively rough roads. As a result, spring suspension means of vehicle bodies do not absorb small minor shocks without transmitting them to a substantial extent to the vehicle body and thus to the passengers.

Accordingly, when a vehicle is traveling over a ridgy or wavy road, the passengers are constantly subjected to minor but annoying vertical forces. Of course, some of the highway irregularities are absorbed through the vehicle tires, and there is more absorption of such minor vertical movements through the newer low pressure tires than in conventional tires. Here again, it is necessary to construct the tires to absorb substantial shocks and the tires of all vehicles are sufficiently resistant to deflection to transmit to the vehicle minor irregularities in the road surface.

An important object of the present invention is to provide novel and simple means for forcing a vehicle tire to absorb minor road irregularities without transmitting vertical forces to the vehicle body, whereby the passengers in the vehicle will ride with a remarkable degree of comfort which cannot be attained by any other means.

A further object is to provide an inertia device in combination with a vehicle wheel which is operative to tend to cause the axles to travel smoothly without vertical deflection by causing the vehicle tires to be more responsive to minor road irregularities, thus preventing such irregularities from being transmitted to the wheel and through the spring suspension means to the body, thus increasing the degree of riding comfort of the vehicle.

A further object is to provide inertia means which is so operative as to generate forces acting radially outwardly of each vehicle wheel and wherein the vertical components of the radial forces vary according to irregularities in a road surface whereby, when a vehicle wheel passes over a slightly elevated spot in a highway, the vertically upwardly acting components decrease materially and the vertically downwardly acting components are momentarily increased, thus tending to prevent any upward deflection of the associated axle.

A further object is to provide a device of the character referred to which readily may be manufactured as a unit for easy attachment to each wheel of a motor vehicle.

A further object is to provide such a device which is or readily may be placed in static and dynamic balance so as not to affect the balancing of the vehicle wheels whereby the use of the device is highly advantageous for the reasons stated and offers no disadvantage in its use as a vehicle wheel accessory.

Other objects and advantages of the present invention will become apparent during the course of the following description.

In the drawing, I have shown two embodiments of the invention. In this showing,

Figure 1 is a side elevation of a vehicle wheel, a portion of the hub cap being broken away and the invention being shown in operative position, Figure 2 is a side elevation of the present device detached from a wheel, parts being broken away and shown in section, Figure 3 is a section taken on line 3—3 of Figure 2, Figure 4 is an enlarged sectional view of a modified form of one of the inertia mass containers, Figure 5 is a fragmentary side elevation of the device and a portion of the vehicle wheel showing one method of attaching the device to the wheel, parts being shown in section, and Figure 6 is a detailed sectional view showing a modified form of attaching device.

Referring to Figures 1 and 2, the numeral 10 designates a conventional automobile wheel having a rim 11 upon which is mounted a resilient tire 12. Wheels of this type are conventionally mounted upon the associated plates in either of two ways. In Figure 5, the wheel supporting plate carries outstanding threaded studs 13 extending through the wheel and the latter is fixed in position by threading nuts 14 on such studs. In Figure 6, the attaching means is in the form of a threaded stud bolt 15 attachable to the supporting plate and carrying a head 16. In either case, the stud or stud bolt extends through an opening 17 in the wheel 10 in accordance with conventional practice.

The device forming the subject matter of the present invention is indicated as a whole by the numeral 20 and comprises a circular plate 21 having a large central opening 22 through which the axle 23 projects (Figure 5) to be capped as at 24. The plate 21 has circumferentially spaced openings 26 preferably corresponding in number and arrangement to the studs 13 or stud bolts 15 for the attachment of the plate 21 in accordance with the preferable practice to be described.

The plate 21 is preferably attached in either of the ways shown in Figures 5 or 6. Where studs 13 are employed in the wheel attaching means, such studs are drilled and tapped as at 30 to receive a small stud bolt 31 projecting through the plate 21 and having its head 32 engageable against the plate 21. Where stud bolts are employed as in Figure 6, each stud bolt is drilled and tapped as at 34 to receive one of the stud bolts 31. The heads 32 of such stud bolts, of course, engage the plate 21, and the bolts 31 obviously fix the device 20 relative to the wheel.

The plate 21 carries a plurality of preferably integral housings 38 arranged radially relative to the axis of rotation of the wheel. These housings form chambers 39 therewithin which are preferably square in cross section, the square shape of the housings 38 being apparent in Figure 5. This shape is preferred for two reasons. It provides each chamber 39 with greater capacity for a given size, and this is important since it will be apparent from Figure 1 that the entire device is housed within the conventional hub cap 40. In the second place, for reasons which cannot be fully explained but which have been determined by extensive experiments, housings of rectangular cross section, and preferably square, have been found to provide the highest degree of efficiency for a given total weight of the device.

Each housing 38 contains a body of a liquid 42 preferably of a high specific gravity, and for this purpose, mercury is preferred. Two forms of openings for the introduction of the mercury, and for sealing the mercury in the chambers have been illustrated in Figures 3 and 4. In Figure 3, the radially inner end of each housing 38 is shown as being provided with a boss 44 having an opening 45 therethrough for the introduction of the mercury. The quantity of mercury introduced into each housing is preferably carefully weighed to assist in preserving the balance in the device and each opening 45 is closed by a plug 46 driven into position. This method of sealing each housing is advantageous because of its simplicity and because any or all of the bosses 44 and the radially inner ends of the plugs 46 may be ground off for the purpose of establishing static and dynamic wheel balance. If preferred, each of the openings for the introduction of mercury may be threaded as in Figure 4 to receive a closure screw 48 having a head 49 engageable with a sealing washer 50. In this form of the invention, of course, a small amount of metal may be ground from the head 49 or the radially outer ends of the housings 38 may be sufficiently thick to sacrifice some of the metal for the purpose of establishing proper wheel balance. There is no objection to the form of the invention shown in Figure 4 except from a cost standpoint, it being more expensive to tap the openings, provide screws 48 instead of plugs 46, and to provide washers 50. Moreover, it is more practicable to provide the form of the invention in Figure 3 because of the ease with which surplus metal may be provided and ground off from the bosses 44 to establish wheel balance. Moreover, the openings 45 may be cast in the formation of the device to receive the plugs 46.

Operation

When the vehicle is at rest, the mercury in each housing 38 will seek its own level as in Figure 2. It will be understood that one of the devices is preferably provided for each of the vehicle wheels and the devices are attached to the wheel in either of the ways described above. As soon as the wheels start to rotate, each body of mercury will be moved radially outwardly by centrifugal force and it will be apparent that so long as the vehicle is moving above a reasonable speed, for example, eight to ten miles per hour, the mercury will remain in the radially outer ends of the chambers 39 and will, by centrifugal force, exert radially outward pressure against the radially outer ends of the housings. This centrifugal pressure will increase as the speed of the vehicle increases, and this fact is taken advantage of, as will become more apparent below, since it is well known that the higher the speed of a vehicle the more sudden and forceful are the thrusts transmitted against the vehicle tires by road irregularities.

The housings 38 above a horizontal plane through the axis of each wheel have upward vertical components of force exerted thereagainst by the mercury within the associated chambers 39. Conversely, there are downward vertical components of force present below such horizontal plane through each wheel, and so long as a highway surface is perfectly flat, assuming this to be possible, the upward and downward vertical components of force balance each other.

Assuming that a vehicle wheel passes over an upwardly extending irregularity in the road, an immediate upward vertical force will be transmitted to the associated tire. There will be a tendency for the wheel to be forced upwardly by all of the vertical forces not absorbed by the tire. A very slight tendency for the wheel to rise will result in a momentary reduction in the upward vertical components of force of the mercury in the upper chambers. On the other hand, the effect of the downwardly acting components of the force exerted by the mercury will be substantially increased by the sudden slight tendency for the wheel to rise. Thus the forces exerted by the mercury have been found to oppose strongly the tendency for the wheel to rise, and thus a strong opposition is set up against any tendency for the tire to transmit upward forces to the wheel and in passing over relatively small irregularities in the road, it has been found that the tires of the vehicle can be forced to absorb all of the upward forces which would be noticeable to passengers in the vehicle. In traveling over wavy macadam roads and gravel roads which have become transversely ridged, it has been found that the present device is so remarkable in its effect that on roads of this type, passengers have the same feeling of smooth riding that is present when traveling over the most perfect concrete roads.

In tests which have been made with the device, strips of wood have been laid transversely of a road and one of the hub caps of a vehicle has been supplied with a flashlight supplied with current from batteries balanced relative to the device. The vehicle, with the flashlight operating, has been driven at night over the strips of wood past a camera having its shutter open for a time exposure and the line of light developed on the film has been almost perfectly straight. The same test made without the present device with the vehicle traveling at the same speed, shows a wavy line on the film, the upward waves corresponding to the wavy movement of the vehicle wheel axis when passing over the strips of wood. Even at as low a speed as ten miles per hour, this test has graphically proved the efficiency of the present device.

At higher vehicle speeds, there is a greater tendency for the axis of each vehicle wheel to move upwardly over a given rise in the road. The present device automatically compensates for this. Since the centrifugal forces generated will increase with the vehicle speed, it follows that the vertical components of force referred to above are greater, and a substantially increased vehicle force differential is set up by any slight tendency for the vehicle wheel to rise or fall when passing over road irregularities at higher vehicle speeds.

It is appreciated, of course, that vehicle tires cannot be made to absorb all vertical forces to which they may be subjected, and the present device is not intended to absorb major shocks which might be destructive to the tires. It has been found that a relatively light mass of mercury is highly effective for absorbing minor and annoying road irregularities. It is not necessary to use large quantities of mercury, the mass of which would result in such a strong tendency for the vehicle wheels to travel in a straight line over such major road irregularities as might cause tire damage, for example, when striking chuck holes and the like. The device is so remarkably efficient for causing the tire, without danger to the latter, to absorb minor road irregularities that the device may be made sufficiently small to be housed within conventional hub caps. Aside from the bodies of mercury, the devices have no moving parts and are permanently attachable to the vehicle wheels in the manner stated.

I claim:

1. In combination with a vehicle wheel having studs for attaching it with respect to an axle, and a resilient tire mounted on said wheel, a circular plate mounted against said wheel coaxially thereof and provided with a plurality of openings each coaxial with one of said studs, stud screws passing through said openings and threaded into said studs to fix said plate to said wheel, a plurality of radial housings carried by said plate and forming chambers therein, and uniform bodies of fluent inertia material in said chambers, said housing being uniformly circumferentially spaced and said chambers being of uniform cross-sectional shape and area whereby said fluent material, when the wheel rotates, generates centrifugal forces against the radially outer ends of said chambers, said centrifugal forces having upwardly and downwardly acting vertical components of force the former of which is diminished and the latter of which is increased upon the transmission of upward forces to the wheel incident to the passage of the tire over a raised spot in the highway to tend to prevent upward movement of the wheel and cause the tire to absorb the force occurring incident to the passage of the tire over said raised spot.

2. The combination set forth in claim 1 wherein said chambers are of rectangular cross-section, each housing being provided in a radial extremity thereof with an opening for the introduction of fluent material thereinto, and a plug closing said opening.

3. In combination with a vehicle wheel having studs for attaching it with respect to an axle, said wheel having a hub cap and being provided with a tire, a circular plate mounted against said wheel coaxially thereof and provided with a plurality of openings each coaxial with one of said studs, stud screws passing through said openings and threaded into said studs to fix said plate to said wheel, a plurality of radial housings carried by said plate and forming chambers therein, and uniform bodies of fluent inertia material in said chambers, said housings being uniformly circumferentially spaced and said chambers being of uniform cross-sectional shape and area whereby said fluent material, when the wheel rotates, generates centrifugal forces against the radially outer ends of said chambers, said centrifugal forces having upwardly and downwardly acting vertical components of force the former of which is diminished and the latter of which is increased upon the transmission of upward forces to the wheel incident to the passage of the tire over a raised spot in the highway to tend to prevent upward movement of the wheel and cause the tire to absorb the force occurring incident to the passage of the tire over said raised spot, the device being housed within the hub cap to be protected and concealed thereby.

4. A device for stabilizing movement transverse to a given axis of a wheel rotatable on such axis, comprising a circular plate, means for fixing said plate to the wheel coaxially thereof for free rotation therewith, a plurality of housings carried by said plate and each forming a chamber therewithin, said chambers being of uniform cross-sectional shape and size and being of the same length, a body of relatively heavy fluent material in each chamber, said bodies of material being of the same weight and said chambers being uniformly circumferentially spaced whereby said bodies of material generate circumferentially uniform centrifugal forces against the radially outer ends of said chambers, each of said housings having an opening at a radial extremity thereof for the introduction of fluent material into the associated chamber, and a plug in each opening to seal the associated chamber, each housing having a raised boss surrounding the opening therein and said plug having a driving fit in such opening, the end of the plug and the material of the boss providing excess material which may be ground away to balance the device.

5. A stabilizing device for a vehicle wheel equipped with a pneumatic tire comprising a plate, means for fixing the plate to the wheel coaxially thereof for free rotation therewith, a plurality of housings carried by said plate and each forming a chamber therewithin, said chambers being of uniform cross-sectional shape and size and being of the same length, a body of relatively heavy fluent material in each chamber, said bodies of material being of the same weight and said chambers being uniformly circumferentially spaced whereby said bodies of material generate circumferentially uniform centrifugal forces against the radially outer ends of said chamber and a raised boss surrounding the opening at a radial extremity thereof for the introduction of fluent material into the associated chamber, and a raised boss surrounding the opening, and a closure means for each opening to seal the associated chamber, a portion of said closure means and the material of the boss providing excess material which may be ground away to balance the device.

6. In combination with a vehicle wheel having a resilient tire mounted thereon, a substantially circular, flat plate mounted on said wheel coaxially thereof and being of a size to fit within a hub cap conventionally associated with the wheel, said plate having a plurality of openings therein, means cooperating with said openings for securing said plate to the wheel, a plurality of radially extending housings carried by said plate and each forming a chamber therewithin, and uniform bodies of liquid material in said chambers, said housings being uniformly circumferentially spaced and said chambers being of uniform cross-sectional shape and area whereby said liquid material, when the wheel rotates, generates centrifugal forces against the radially outer ends of said chambers, said centrifugal forces having upwardly and downwardly acting vertical components of force the former of which is diminished and the latter of which is increased upon the transmission of upward forces to the wheel incident to the passage of the tire over a raised spot in the highway to tend to prevent upward movement of the wheel and cause the tire to absorb the force occurring incident to the passage of the tire over said raised spot.

STEWART D. ORMSBY.

References Cited in the file of this patent

UNITED STATES PATENTS

| Number | Name | Date |
| --- | --- | --- |
| 1,230,205 | Nichols | June 19, 1917 |
| 1,246,443 | Lofland | Nov. 13, 1917 |
| 1,765,477 | Ackerman | June 24, 1930 |
| 1,819,266 | Rued | Aug. 18, 1931 |
| 2,094,637 | Burger | Oct. 5, 1937 |
| 2,180,351 | Fischer | Nov. 21, 1939 |
| 2,243,380 | Kinney | May 27, 1941 |